US 8,327,112 B2

(12) United States Patent
Stecher

(10) Patent No.: US 8,327,112 B2
(45) Date of Patent: *Dec. 4, 2012

(54) PROCESSING SYSTEM IMPLEMENTING VARIABLE PAGE SIZE MEMORY ORGANIZATION USING A MULTIPLE PAGE PER ENTRY TRANSLATION LOOKASIDE BUFFER

(75) Inventor: Brian Stecher, Kanata (CA)

(73) Assignee: QNX Software Systems Limited, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/018,492

(22) Filed: Feb. 1, 2011

(65) Prior Publication Data

US 2011/0125983 A1    May 26, 2011

Related U.S. Application Data

(63) Continuation of application No. 11/853,451, filed on Sep. 11, 2007, now Pat. No. 7,917,725.

(51) Int. Cl.
*G06F 12/08* (2006.01)
(52) U.S. Cl. ............... 711/207; 711/205; 711/E12.059; 711/E12.061
(58) Field of Classification Search .............. 711/205, 711/208, 207, E12.059, E12.061
See application file for complete search history.

(56) References Cited

U.S. PATENT DOCUMENTS

| 5,752,275 | A | * | 5/1998 | Hammond | .............. 711/207 |
| 5,918,250 | A | | 6/1999 | Hammond | |
| 6,378,059 | B1 | | 4/2002 | Miyoshi | |
| 7,917,725 | B2 | | 3/2011 | Stecher | |
| 2002/0169936 | A1 | | 11/2002 | Murphy | |
| 2004/0215918 | A1 | | 10/2004 | Jacobs et al. | |
| 2006/0123197 | A1 | * | 6/2006 | Dunshea et al. | .............. 711/118 |
| 2008/0104362 | A1 | | 5/2008 | Buros et al. | |

FOREIGN PATENT DOCUMENTS

WO    WO 2006/106428 A2    10/2006

OTHER PUBLICATIONS

European Search Report and written opinion, EP 08 01 2125.4, Dec. 22, 2008.

* cited by examiner

*Primary Examiner* — Pierre-Michel Bataille
(74) *Attorney, Agent, or Firm* — Brinks Hofer Gilson & Lione

(57) ABSTRACT

A processing system includes a page table including a plurality of page table entries. Each of the plurality of page table entries includes information for translating a virtual address page to a corresponding physical address page. The processing system also includes a translation lookaside buffer adapted to cache page table information. The processing system also includes memory management software responsive to changes in the page table to consolidate a run of contiguous page table entries into one or more page table entries having a larger memory page size, Y. The memory management software further determines whether the run of contiguous page table entries may be cached in an entry of the translation lookaside buffer that caches multiple page table entries, X, in a single translation lookaside buffer entry.

23 Claims, 8 Drawing Sheets

135

Even page table entry
805

Odd page table entry
810

Even page table entry
805

Odd page table entry
810

PROCESSING SYSTEM IMPLEMENTING VARIABLE PAGE SIZE MEMORY ORGANIZATION USING A MULTIPLE PAGE PER ENTRY TRANSLATION LOOKASIDE BUFFER

PRIORITY CLAIM

This application is a continuation application of U.S. patent application Ser. No. 11/853,451 filed Sep. 11, 2007, which issued as U.S. Pat. No. 7,917,725 on Mar. 29, 2011.

BACKGROUND OF THE INVENTION

1. Technical Field

The present invention relates to memory management in a processing system and, more particularly, to a processing system implementing variable page size memory organization using a multiple page per entry translation lookaside buffer.

2. Related Art

There are a variety of different manners in which the memory of a processing system may be organized. One such manner is through the use of virtual memory. Virtual memory allows software to run in a memory address space in which the size and addressing of the memory space is not tied strictly to the physical memory of the processing system. In virtual memory systems, the operating system maps virtual memory to physical memory. The operating system uses this mapping to detect when an address is required that does not currently relate to main memory so that the requested data can be accessed.

Virtual memory may be implemented through paging. When the processing system uses paging, the low order bits of the virtual address are preserved and used directly as the low order bits of the actual physical address. In contrast, the high order bits may be treated as a key or index to one or more address translation tables that correspond to a range of consecutive physical addresses. The memory referenced by such a range may be called a page. Page sizes may range in size, for example, from 512 bytes through 8 megabytes.

The mappings between virtual memory and physical memory may be stored in page table entries of a page table array. These page table entries may be used by the operating system to execute and virtual address to physical address translations. The processing system also may include a translation lookaside buffer (TLB) to enhance the efficiency with which virtual memory addresses are translated to the corresponding physical addresses. The TLB is a cache that may have a fixed number of entries containing parts of various page table entries to improve the speed of the translation of a virtual address to its corresponding physical address. A TLB may include a content-addressable memory in which the search key is the virtual address and the search result is the physical address and access permissions. If the search of the TLB yields a match, the translation is known very quickly, and the physical address is used to access memory. If the virtual address is not in the TLB, the translation proceeds via the page table, which may take longer to complete.

The page size of the virtual/physical address space often may be fixed and/or difficult to dynamically change. Nevertheless, the page size(s) used in the page table entries and the TLB entries may have an impact on the performance of the system memory. Smaller page sizes may be advantageous when high granularity control of the memory access permissions is required. Likewise, small page sizes may be advantageous when applications only require small portions of the virtual memory space for their operation. Large page sizes, however, may be advantageous when used in connection with a TLB since TLB misses are less likely to occur when the virtual memory space is organized into large pages.

Many systems that employ multiple page sizes do so in a static manner. The versatility of such systems may be very limited. Other systems implement multiple page sizes in a dynamic manner using hardware. Multiple TLBs also may be used with different characteristics associated with each page size. However, the manner in which the multiple page sizes may be realized is restricted to the manner in which it is implemented in the hardware and can add a significant amount of cost to the system.

The difficulty of managing multiple page sizes is also present in systems that employ a MIPS-like architecture. The TLB in a MIPS-like architecture associates multiple physical pages with each TLB entry and may be difficult to manage efficiently. Therefore, a need exists for an improved system that can implement variable page sizes using a multiple page per entry translation lookaside buffer.

SUMMARY

A processing system includes a page table including a plurality of page table entries. Each of the plurality of page table entries includes information for translating a virtual address page to a corresponding physical address page. The processing system also includes a translation lookaside buffer adapted to cache page table information. The processing system also includes memory management software responsive to changes in the page table to consolidate a run of contiguous page table entries into one or more page table entries having a larger memory page size, Y. The memory management software further determines whether the run of contiguous page table entries may be cached in an entry of the translation lookaside buffer that caches multiple page table entries, X, in a single translation lookaside buffer entry.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
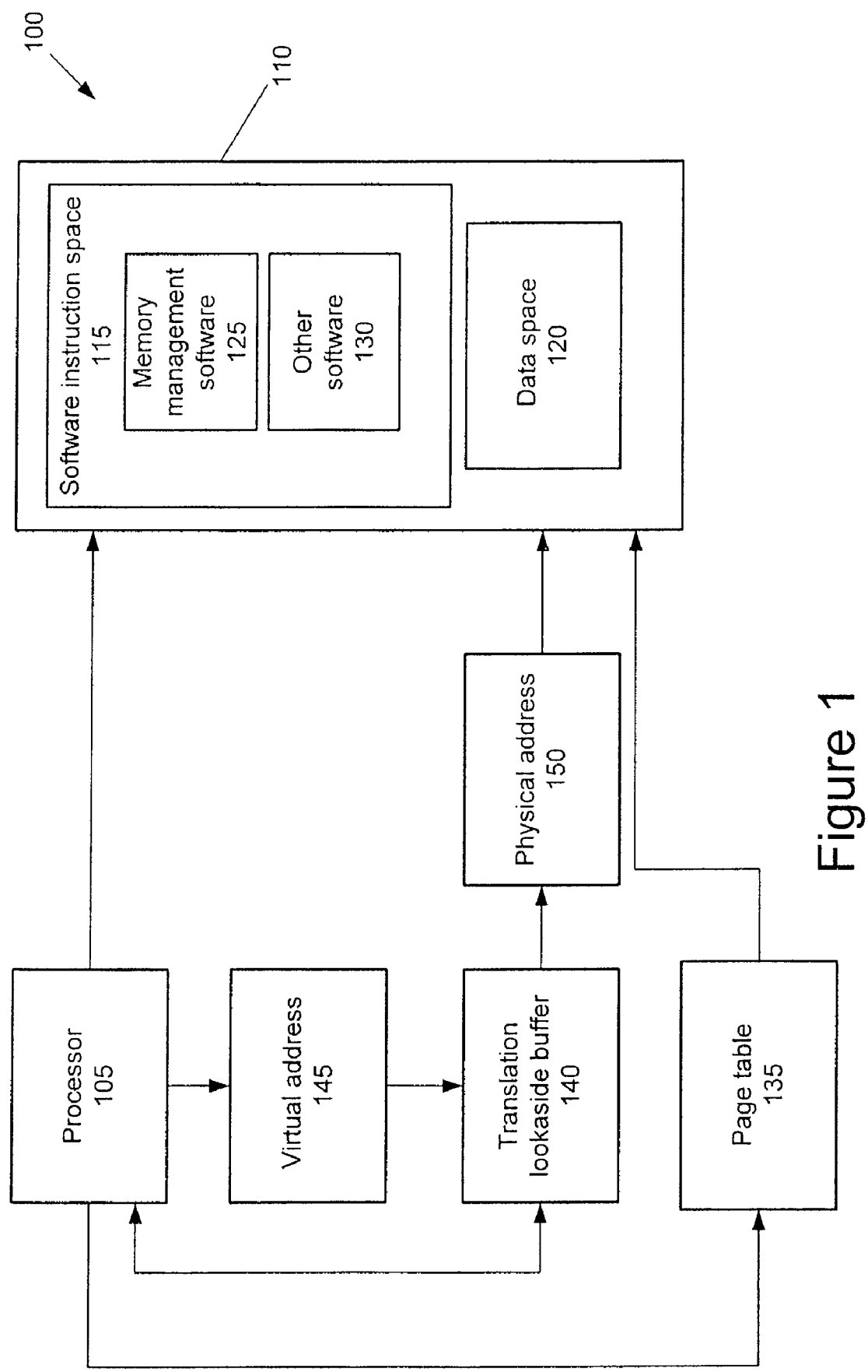
FIG. 1 is a block diagram of an exemplary processing system.

FIG. 1 is a block diagram of a processing system 100 that may implement variable page size memory organization. The processing system 100 includes a processor 105 that accesses physical memory 110. Processor 105 is shown as a single processor. However, system 100 may be implemented as a MIPS-like processing system, a symmetric multiprocessor system, a parallel processing system, or other architecture.

Physical memory 110 may include software instruction space 115 and data space 120. The software instruction space 115 may include memory management software 125 and other software code 130. The memory management software 125 may be executable by processor 105 to manage the memory space of the processing system 100. In FIG. 1, the memory management software 125 manages the memory of system 100 using virtual memory addressing.

In FIG. 1, the processing system 100 employs at least one page table 135 that provides a mapping between virtual memory addresses and corresponding physical addresses of physical memory space 110. Multiple page tables may also be employed and managed. Page table 135 may reside in the physical memory space 110, in a memory management unit, and/or in other physical memory space.

A translation lookaside buffer (TLB) 140 is adapted to cache certain entries of the page table 135. The cache provides faster translations translation between a virtual address provided by processor 105 at block 145 and a physical address provided at block 150. The physical address 150, in turn, is used to access the corresponding entries of physical memory space 110. The TLB 140 may be part of the processor 105, part of a memory management unit, or maybe part of a separate hardware module. In FIG. 1, each entry in TLB 140 is used to cache page translation information corresponding to multiple entries of the page table 135.

Figure 2:
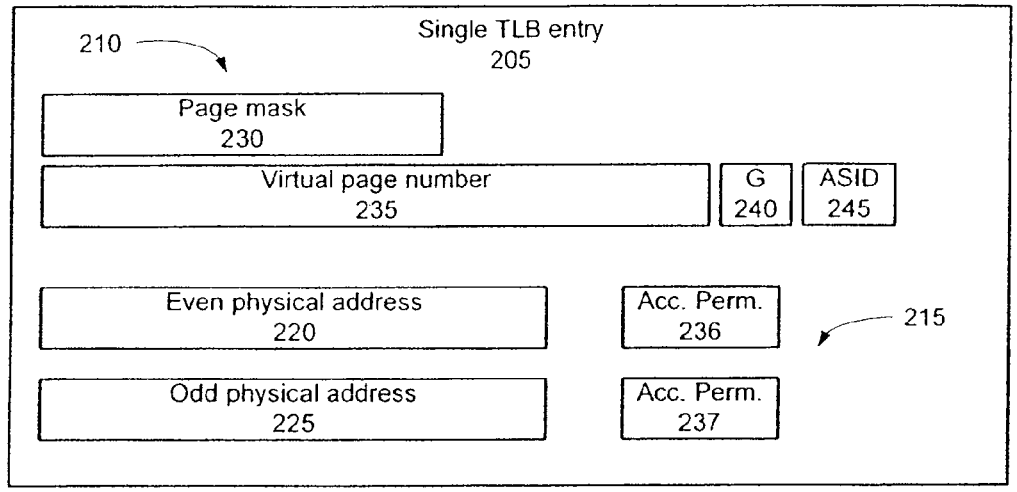
FIG. 2 illustrates a TLB structure that may be used in the processing system shown in FIG. 1.

FIG. 2 illustrates a data structure for a single entry 205 of the TLB 140. In FIG. 2, each TLB entry 205 includes a tag entry information portion 210 and a data entry information portion 215. The tag entry information portion 210 includes information used to identify the virtual page corresponding to the TLB entry 205. The data entry information 215 includes information used to identify the physical page entries corresponding to information located in the tag entry information 210. Each TLB entry 205 therefore provides a mapping between virtual addresses identified in the tag entry information portion 210 and corresponding physical addresses identified in the data entry information portion 215. Further, the data entry information 215 may include access permissions 236 and 237 respectively associated with the each of the individual pages.

The data entry information 215 includes the information corresponding to the multiple pages to which the TLB entry 205 is mapped. Here, each TLB entry 205 is mapped to two physical address pages. In FIG. 2, a first physical address page is identified as an even physical address 220 and may include corresponding access permissions 236. A second physical address page is identified as an odd physical address 225 and may include corresponding access permissions 237.

The access permissions 236 and 237 may be used to identify the particular type of access associated with the individual pages. Such access may include read/write access, read only access, write only access, and/or other corresponding states. Other information such as whether each of the physical addresses 220 and 225 are dirty and/or valid may also be included in the data entry information 215.

The tag entry information 210 may include a page mask value 230 and virtual page number information 235. The page mask value 230 may be used to define the page size of the cached virtual page by masking the appropriate bits of the virtual page number information 235 from involvement in a comparison operation executed during a TLB search. It may also be used to determine which of the physical addresses 220 and 225 are used in the virtual to physical address translation. The virtual page number information field 235 may contain the upper bits of the virtual page number. Because it represents a pair of virtual pages, the last bits of the entry may be used when comparing the virtual address to see if it matches the TLB entry. When a non-multiple page for entry TLB is employed, a mask of 0xfffff000 employed may be applied to the virtual address to see if it matches the entry for a 4 kilobyte page size. In the present system, the mask may use one less bit. Accordingly, a mask of 0xffffe000 may be applied to the virtual address to see if it matches the entry for a 4 kilobyte page size. Additionally, a mask of 0xfffe0000 may be applied to the virtual address to see if it matches the entry for a 64 kilobyte page size. This can be extended beyond two entries to TLBs that support translation of X virtual to physical pages for each TLB entry.

Additionally, the tag entry information 210 may include one or more global bits 240 and an address space identifier 245. The address space identifier 245 may be used to identify which process and/or thread the TLB entry 205 is associated with. The one or more global bits 240 may be used to indicate that the TLB entry 205 is global to all processes and/or threads and may be used to disable the inclusion of the address space identifier 245 in the comparison operations executed during a TLB search.

Figure 3:
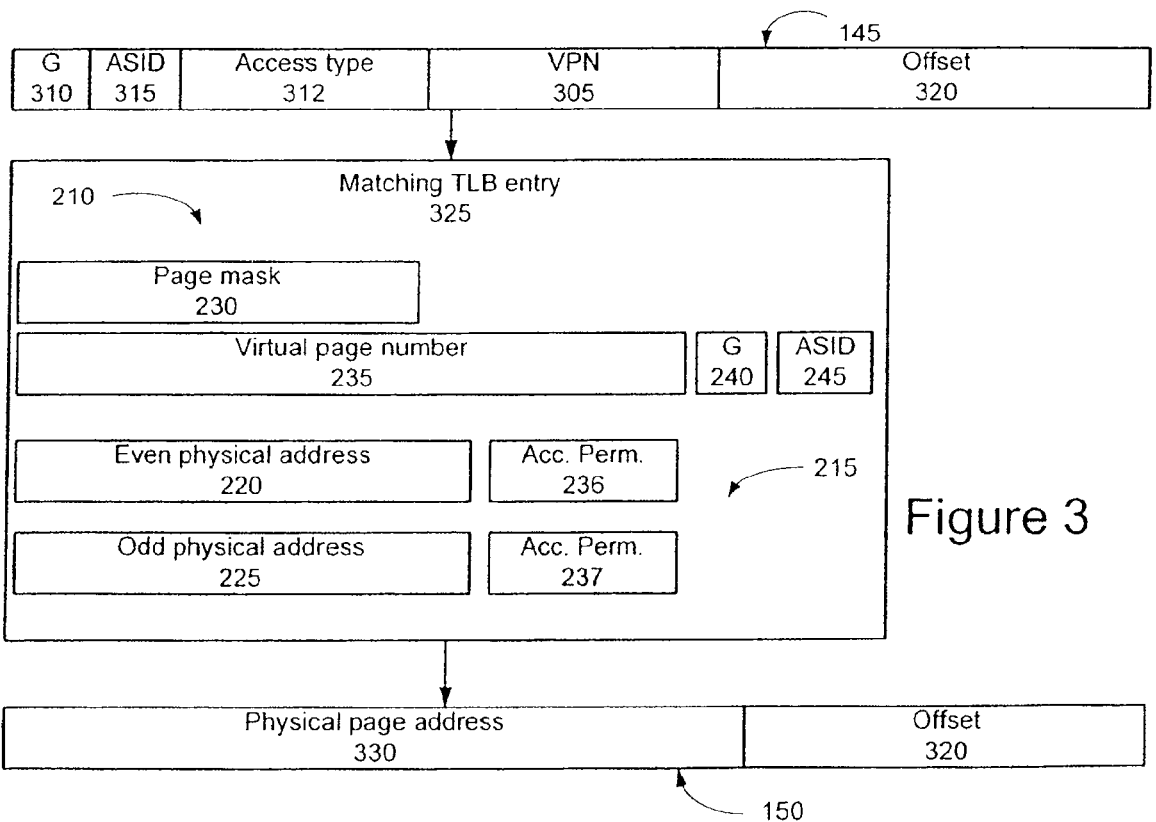
FIG. 3 is a block diagram illustrating a virtual-to-physical address translation process.

FIG. 3 is a block diagram illustrating the virtual-to-physical address translation process. As shown, the virtual page number 305 for the virtual address 145 is provided to the TLB 140 and compared to the tag entry information 210 contained in each of the entries in the TLB 140. The virtual address 145 information may also include one or more global information bits 310, memory access type information 312, and/or an address space identifier field 315. An offset field 320 of the virtual address 145 is not used here in the comparison process.

In FIG. 3, there is a match between the virtual address 145 and a TLB entry 325 in the TLB 140. The physical page information from either the even physical address 220 or the odd physical address 225 is provided at the output of the TLB 140 depending on whether of the virtual address is mapped to the even or odd address page of the TLB 140. The physical page address information 330 provided by the TLB 140 is concatenated with the offset field 320 of the virtual address 145 to generate the complete physical address 150.

Figure 4:
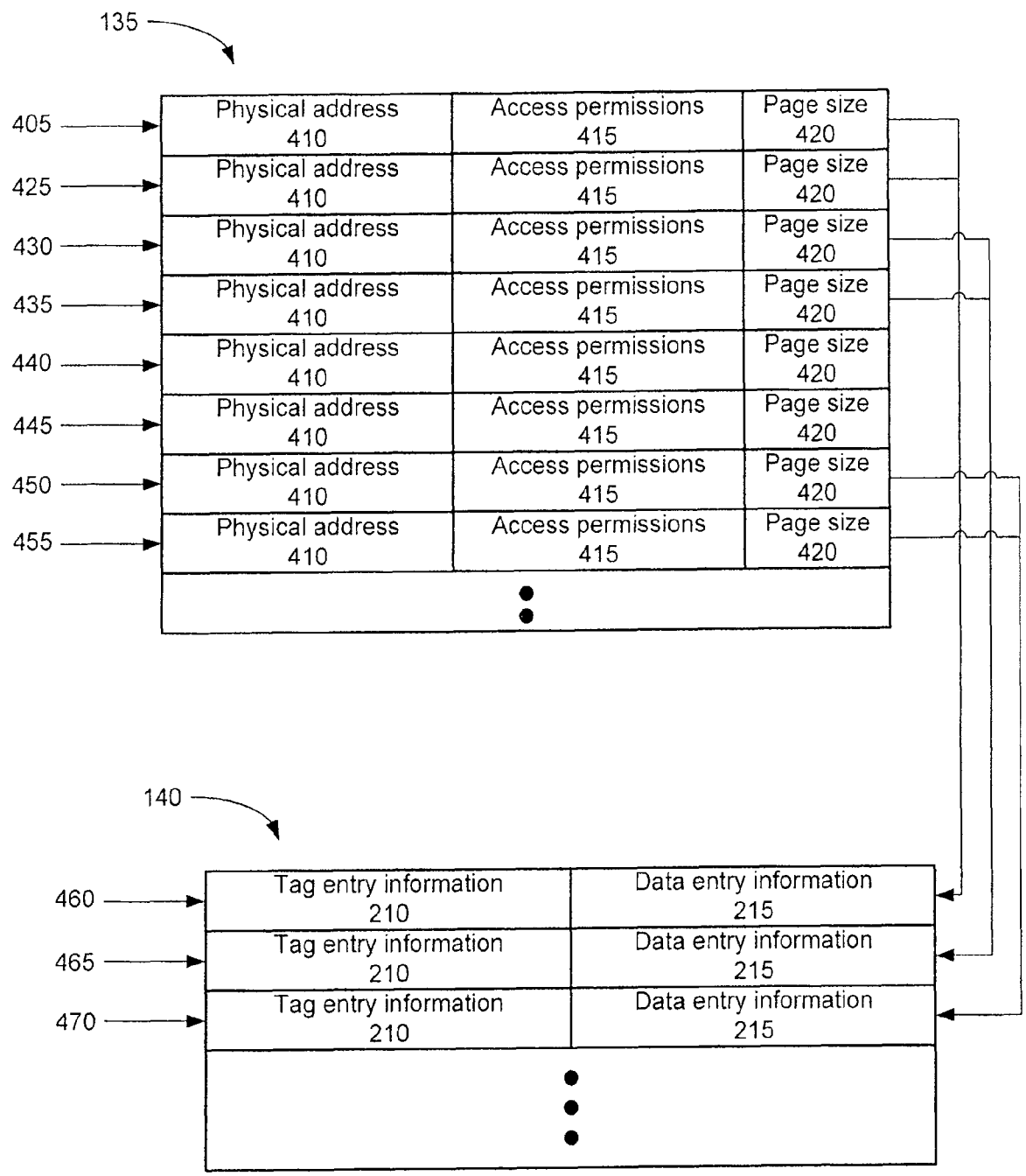
FIG. 4 illustrates one relationship between the entries of the page table and the entries of the TLB.

FIG. 4 illustrates a structure for the page table 135 and its potential relationship with the entries of the TLB 140. In FIG. 4, the page table 135 includes a plurality of page table entries 405, 425-455. Each of the illustrated page table entries 405, 425-455 may include information for translating a virtual address to a corresponding physical address 410. Entries may also include memory page size information 420 identifying the page size of the corresponding virtual address page and access permission information 415 for the corresponding virtual address page. Memory page size information may be omitted 420 in those instances in which the processing system 100 treats each page table entry as though it has a single memory page size. Other information about the virtual address page such as whether the page has been written to by a process and/or when it was last used also may be included in each of the page table entries.

The translation lookaside buffer 140 is used to cache selected entries of the page table 135. Each of the TLB entries, such as those shown at 460, 465, and 470 may include a subset, additional information, or the same information as that found in the page table entries of page table 135. In FIG. 4, each of the TLB entries may structured in the manner shown in FIG. 2 and may include a tag entry information section 210 and a data entry information section 215. It may also include access permission information identifying the access permissions for the corresponding virtual address page. As with the page table entries, other information relating to the address page such as whether the page has been written to by a process and/or when it was last used also may be included in each of the TLB entries.

The TLB 140 may have a limited number of TLB entries. The number of entries may be substantially less than the number of page table entries in page table 135. The selection of the page table entries that are to be cached in the TLB 140 may be determined by one or more caching processes. Such processes may rely on the relative locality of requested/accessed virtual memory locations, the frequency with which the virtual memory locations are accessed by various software applications, and/or other criteria. One or more such processes may be employed based on detailed system requirements, which may vary from system to system.

In FIG. 4, two page table entries are cached in each entry of the TLB 140. For explanatory purposes, page table entries 405 and 425 are cached in TLB entry 460, page table entries 430 and 435 are cached in TLB entry 465, and page table entries 450 and 455 are cached in TLB entry 470. Since page table entries 405 and 425 are cached in the same TLB entry, they each have the same memory page size. Similarly, page table entries 430 and 435 each have the same memory page size as one another. Still further, page table entries 450 and 455 have the same memory page size as one another.

Figure 5:
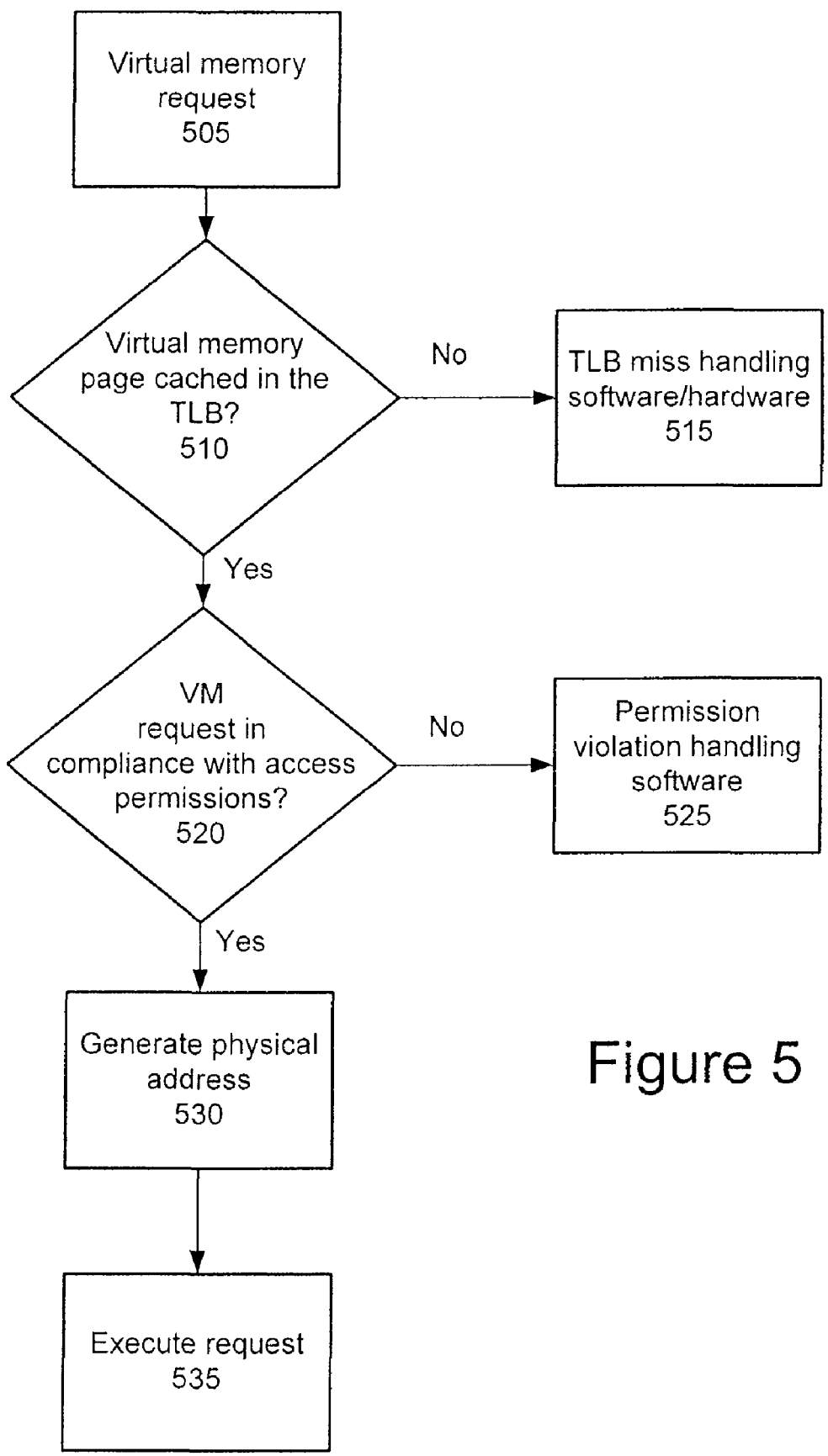
FIG. 5 is a diagram of operations that process a request associated with virtual memory.

FIG. 5 shows operations that may be used to process a request associated with virtual memory. As shown, a virtual memory request is executed at 505. At 510, a check is made to determine whether the virtual memory page associated with the virtual memory request is cached in the TLB 140. If it is not, the system 100 may execute one or more operations associated with TLB miss handling software at 515. However, if the virtual memory page associated with the virtual memory request is cached in the TLB 140, the processing system 100 continues to process the request to determine whether the request complies with the access permissions associated with the virtual memory page. The system 100 may check the access permissions of the corresponding TLB entry to make sure that the request does not violate the permissions for the virtual memory page. Such permissions may identify the corresponding virtual memory page as read-only, write-only, read/write, a global memory page, a process/thread specific memory page, or another state. If the virtual memory request at 505 is invalid as determined by the check at 520, the processing system 100 may execute one or more operations associated with permission violation handling software 525. Otherwise, the TLB 140 uses the upper bits of the virtual memory to generate the upper portion of a physical address page, while the lower bits of the virtual memory address may be used as an offset into the physical address page. These operations may be executed at 530. Execution of the virtual memory request using the corresponding physical address is executed at 535.

Figure 6:
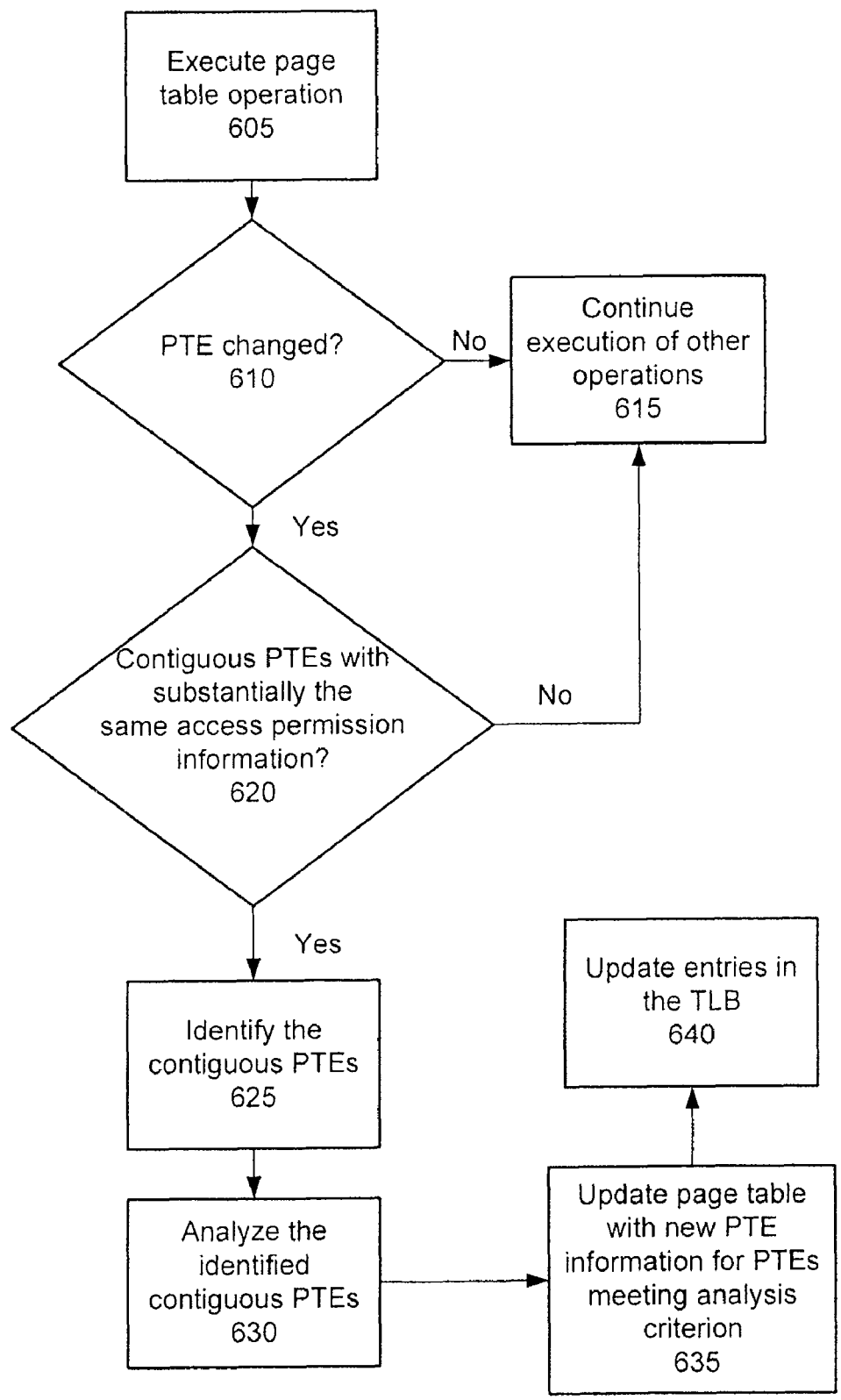
FIG. 6 is a diagram of operations that implement variable page size memory organization.

FIG. 6 is a flow diagram showing operations that may be executed to implement variable page size memory organization using a TLB 140 in which information to conduct multiple virtual to physical page translations, X, are stored in a single TLB entry. For simplification, FIG. 6 is directed to the use of a TLB having two page entries per TLB entry (X=2). At 605, a page table operation is executed. This operation may include any operation that alters the page table 135 such as, for example, accessing page table entries, adding page table entries, removing page table entries, updating page table entries, or other operations. At 610, the processing system 100 checks the page table 135 to determine whether the operation executed at 605 has changed a page table entry. Such changes may include whether a new page table entry has been added, whether an existing page table entry has been removed, or other operations. If the operation executed at 605 has not resulted in such a change to one or more of the page table entries, the processing system 100 continues with the execution of other operations at 615.

If the operation executed at 605 has resulted in a change to the page table entries of the page table 135, a further operation is executed at 620 in which the processing system 100 determines whether the changes have resulted in a range of contiguous page table entries having common characteristics. Contiguous page table entries may be those that have both contiguous virtual addresses and contiguous physical addresses. At 620, the check involves locating contiguous page table entries having substantially the same or identical access permission information. To increase the efficiency of this check, the operation at 620 may be limited to a check of page table entries within a certain locational distance of the changed page table entry. If no such contiguous page table entries are found during the check at 620, the processing system 100 may continue execution of other operations at 615.

If contiguous page table entries having the requisite common characteristics are found, the contiguous page table entries are identified at 625 and analyzed at 630. The analysis at 630 may include, for example, an analysis of whether any of the contiguous page table entries may be consolidated into one or more page table entries having a larger page size than the page size of the original contiguous page table entries. The new, larger page size may be a multiple of the smallest page size used to organize the virtual memory space of the processing system 100. For example, if there are sixteen contiguous page table entries identified at 625 that have a page size of 4 kilobytes each, the page size for the contiguous page table entries may be updated to a larger virtual page size of 64 kilobytes. Similarly, if there are 256 contiguous page table entries identified at 425 that have a page size of 4 kilobytes each, the page size for the contiguous page table entries may be updated to a larger virtual page size of 1 megabyte. However, because the page size cannot be chosen independently for all of the pages (even/odd pages should both have the same page size), the analysis at 625 also determines whether the allowed page sizes are a multiple of the contemplated larger page size. Since each TLB entry in processing system 100 is used to cache two page table entries, the analysis at 625 determines whether the contiguous run length is greater than or equal to twice the originally contemplated larger page size. For example, when checking to determine whether a 16 kilobyte page size can be used for a run of contiguous entries, the analysis operation 625 makes sure that the virtual address that is to be used is a multiple of 32 kilobytes and that there are two runs of contiguous page table entries that are each 16 kilobytes in size. Contiguous page table entries meeting the analysis criterion applied at 630 may be updated at 635 with the new page size information.

Entries in the TLB 140 corresponding to the page table entries updated at 635 are updated at 640 with the new page size information. The updating operation applied at 640 may involve consolidating all of the TLB entries corresponding to any of the consolidated contiguous page table entries into a single TLB entry with new information, including the new page size information. The remaining TLB entries corresponding to the consolidated contiguous page table entries may be removed from the TLB 140 thereby freeing TLB memory and allowing the TLB 140 to cache more page table entries. Alternatively, multiple TLB entries may be updated to correspond to the consolidated entries with the new page size.

The number of contiguous page table entries identified at 620 of FIG. 6 that are consolidated to entries having a larger page size may vary. For example, it may be possible to consolidate all of the contiguous page table entries identified at 620. Alternatively, it may be possible to consolidate one or more subsets of the identified contiguous page table entries to corresponding page table entries of the same or different page sizes. Which of the contiguous page table entries identified at 620 are ultimately consolidated, if any, may depend on system design specifications and the specific analysis requirements applied to the identified entries at 630.

Figure 7:
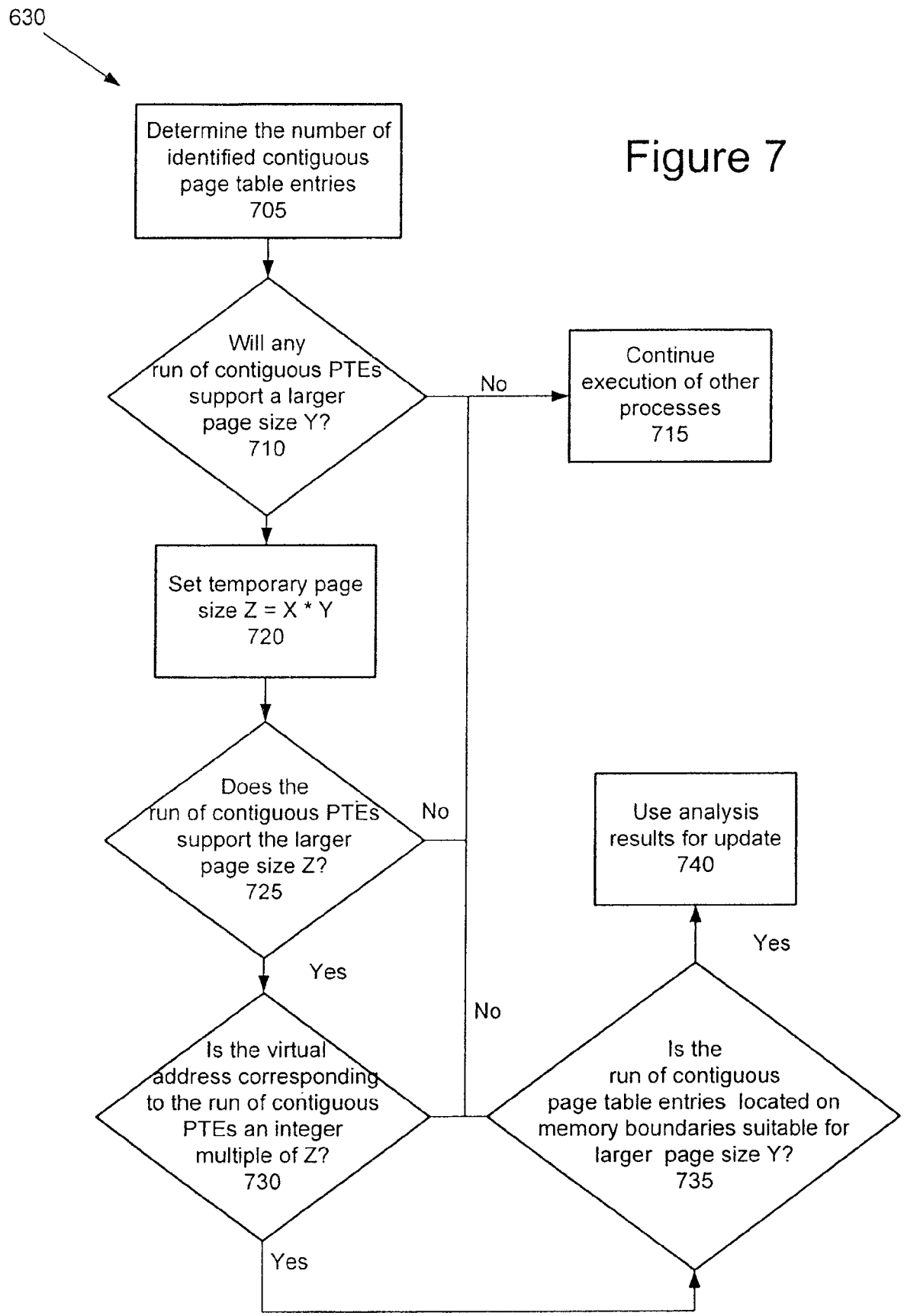
FIG. 7 is a diagram of operations that may be executed by the processing system during the analysis operation shown in FIG. 6.

FIG. 7 shows operations that may be executed by the processing system 100 during the analysis operation shown at 630 of FIG. 6. In FIG. 7, the operations are executed to determine whether any of the identified contiguous page table entries of 625 meet the criterion for consolidating them into one or more page table entries having a larger page size that may be properly formatted for caching in TLB 140. The number of identified contiguous page table entries are determined at 705. At 710, the process determines whether any run of the contiguous page table entries in the identified range can be consolidated into a page table entry having a larger page size Y. The number of contiguous page table entries that should exist in the decision operation at 710 before they are consolidated to a page table entry having a page size of Y may vary from system to system. In FIG. 7, the page size Y may be 64 kilobytes, 128 kilobytes, 256 kilobytes, 512 kilobytes, and/or 1 megabyte. Such values are commonly used in many processing system architectures, although other page size values also may be employed. The page sizes used in the processing system 100 may be limited, for example, by the page sizes supported in the TLB 140 and/or by the page table 135.

If the process determines that there are no runs of contiguous page table entries that can be consolidated, the processing system 100 may continue execution of other processes at 715. If the processing system determines that there are runs of contiguous page table entries that can be consolidated, further criterion are applied at 720 through 735 to confirm that the run may indeed be consolidated.

The page size cannot be chosen independently for all pages, X, stored in a single TLB entry. Rather, each page entry, X, stored in a single TLB entry may have the same page size. The number of page entries, X, stored in a single TLB entry is therefore considered at 720 through 730. At 720, a temporary page size, Z, is set for comparison to the contiguous run to make sure that the run can be consolidated in a single TLB entry. The temporary page size, Z, is set so that it corresponds to the larger page size, Y, multiplied by the number of entries, X, stored in a single TLB entry. At 725, the system determines whether the run of contiguous page table entries supports the larger page size, Z. For example, when determining whether a 16 kilobyte page size can be used for a contiguous run, the process determines at 725 whether the run of contiguous page table entries is greater than or equal to 32 kilobytes (Y=16 KB, X=2, and Z=32 KB). If not, the contiguous run is not consolidated and the system continues execution of other processes at 715.

If the contiguous run of page table entries supports the temporary larger page size, Z, the process determines at 730 whether the virtual address corresponding to the run of contiguous page table entries is equal to or an integer multiple of the temporary larger page size, Z. If it is, the analysis at 735 determines whether the run of contiguous page table entries are located on physical page table boundaries suitable for use with the proposed larger page size value, Y. For example, if a set of 16 kilobytes/page contiguous page table entries are to be consolidated to a page table entry having a final page size of 32 kilobytes, the first page table entry of the set of contiguous page table entries should begin at a 32 kilobyte physical boundary of the memory space 110. If the contiguous run of page table entries meet the memory boundary criterion of 735, then the contiguous page table entries that are to be consolidated and the proposed page size, Y, are passed to 635 of FIG. 6 at 740. Otherwise, the processing system 100 may continue with the execution of other processes at 715.

Figure 8:
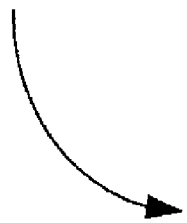
FIG. 8 is a diagram showing one manner in which the entries of the page table may be sequenced.

In a MIPS-like TLB architecture, the TLB miss handling operation 515 shown in FIG. 5 is implemented in software. When a TLB miss occurs, the corresponding miss handling software loads the TLB 140 with the missed page table entry from the page table 135. To ensure that the TLB 140 is properly loaded, the page table entries of the page table 135 may be formatted in the manner shown in FIG. 8. In FIG. 8, the information corresponding to an even page table entry 805 immediately proceeds the information corresponding to the odd page table entry 805. This formatting may be employed so that the TLB miss handling software may fill a single TLB entry from two consecutive page table entries 805 and 810, when X=2, as in the TLB 140 shown in FIG. 2. The page table entries of the page table 135 may be formatted so that X consecutive page table entries are used by the TLB miss handling software to fill a single TLB entry when the TLB 140 supports X page table entries per TLB entry.

Figure 9:
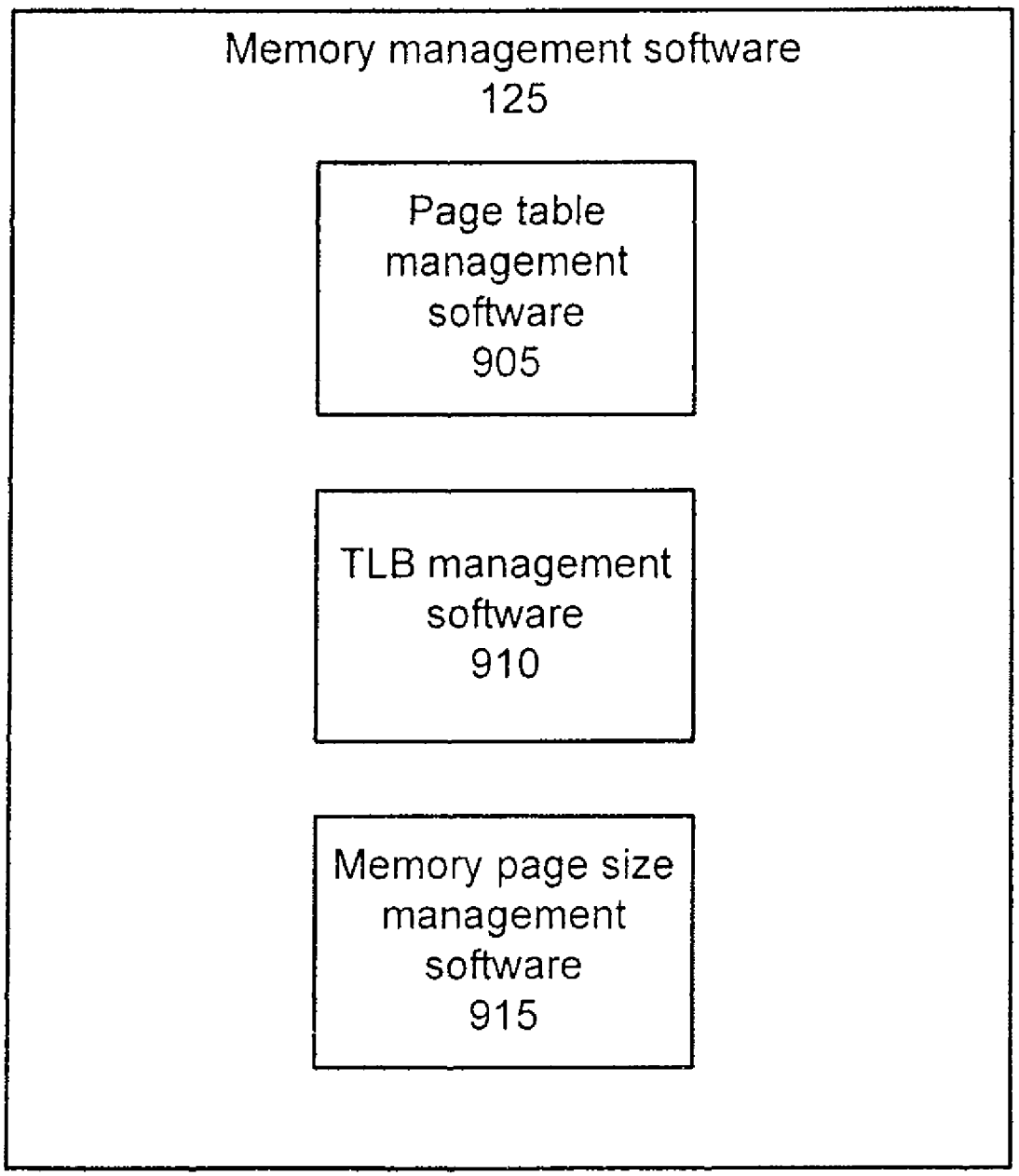
FIG. 9 is a block diagram of the memory management software shown in FIG. 1.

FIG. 9 is a diagram illustrating one memory management software architecture 125. The memory management software 125 may include page table management software 905, TLB management software 910, and memory page size management software 915. The page table management software 905 may manage a page table, such as page table 135, having a plurality of page table entries. Each of the plurality of page table entries may include information for translating a virtual address to a corresponding physical address, memory page size information for a corresponding virtual address page, and access permission information for the corresponding virtual address page. The page table management software 905 may arrange the page table entries in the manner shown and described in connection with FIG. 8. The translation lookaside buffer management software 910 may manage a translation lookaside buffer that is adapted to cache information corresponding to a plurality of the page table entries. The translation lookaside buffer managed by software 910 may support multiple virtual to physical address translations, X, for each TLB entry.

The memory page size management software 915 may be responsive to changes in the page table made by the page table management software to identify a run of contiguous page table entries having substantially same access permission information. The run of contiguous page table entries is analyzed by the memory page size management software 915 to determine whether the run can support a larger page size in the TLB 140. The memory page size management software 915 may limit its analysis operations to a predefined range of page table entries to increase efficiency. Analysis may be limited to contiguous page table entries that are locally proximate page table entries that have been changed in the page table, deleted from the page table, and/or added to the page table. The change, deletion, and/or addition may correspond to the change in the page table to which the memory page size management software has responded to make the check. Further, the memory page size management software may be responsive to changes in the page table to facilitate updating the memory page size information for all of the contiguous page table entries with the new memory page size information.

The specific functionality of each of the components of the memory management software 125 set forth above may be shared between them. There need not be any strict divisions of that functionality. In one system, the memory page size management software 715 may directly update the corresponding entries of the translation lookaside buffer. In another example, the memory page size management software 715 may cooperate with the translation lookaside buffer management software 710 to execute the TLB update.

As shown in FIG. 1, the memory management software 125 may reside in a physical memory 110. The physical memory 110 may be a random access memory or similar fixed or distributed storage medium. In other systems, the memory management software 125 may reside on other storage media for use, storage, and or transfer of the software code. Such storage media may include, for example, a hard disk drive, a USB drive, flash memory, read only memory, optical storage media, or other storage media.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A processing system comprising:
a page table including a plurality of page table entries, where each of the plurality of page table entries includes information for translating a virtual address page to a corresponding physical address page;
a translation lookaside buffer adapted to cache page table information; and
memory management software responsive to changes in the page table to consolidate a run of contiguous page table entries into one or more page table entries having a larger memory page size, Y, and where the memory management software further determines whether the run of contiguous page table entries may be cached in an entry of the translation lookaside buffer that caches multiple page table entries, X, in a single translation lookaside buffer entry.

2. The processing system of claim 1, where the memory management software updates the entry of the translation lookaside buffer using the larger memory page size, Y, if the memory management software determines that the run of contiguous page table entries may be cached in the entry of the translation lookaside buffer.

3. The processing system of claim 1, where the memory management software consolidates the run of contiguous page table entries based on access permissions for the run of contiguous page table entries.

4. The processing system of claim 1, where the memory management software determines whether the run of contiguous page table entries can support a memory page size of $X*Y$ pursuant to determining whether the run of contiguous page table entries may be cached in the entry of the translation lookaside buffer.

5. The processing system of claim 1, where the memory management software determines whether a virtual address corresponding to the run of contiguous page table entries is a multiple of Z pursuant to determining whether the run of contiguous page table entries may be cached in the entry of the translation lookaside buffer, where $Z=X*Y$.

6. The processing system of claim 1, where the memory management software consolidates the run of contiguous page table entries based on memory boundary conditions for the run of contiguous page table entries.

7. The processing system of claim 1, where the memory management software organizes the page table entries of the page table so that consecutive page table entries may be accessed to fill a single translation lookaside buffer entry.

8. The processing system of claim 1, where the memory management software comprises translation lookaside miss software, where the translation lookaside miss software accesses consecutive page table entries to fill a single translation lookaside buffer entry, and where the number of consecutive page table entries is equal to X.

9. The processing system of claim 1, where $X=2$.

10. The processing system of claim 1, where the translation lookaside buffer comprises a plurality of translation lookaside buffer entries that each cache a different number of page table entries in a single translation lookaside buffer entry.

11. A memory management system comprising:
a physical memory comprising memory management software, where the memory management software comprises:
page table management software adapted to manage a page table including a plurality of page table entries, where each of the plurality of page table entries includes information for translating a virtual address page to a corresponding physical address page;
translation lookaside buffer management software adapted to manage a translation lookaside buffer; and
memory page size management software responsive to changes in the page table to consolidate a run of contiguous page table entries into one or more page table entries having a larger memory page size, Y, and where the memory page size management software further determines whether the run of contiguous page table entries may be cached in an entry of the translation lookaside buffer that caches multiple page table entries, X, in a single translation lookaside buffer entry.

12. The memory management system of claim 11, where the translation lookaside buffer management software updates the entry of the translation lookaside buffer using the larger memory page size, Y, if the memory page size management software determines that the run of contiguous page table entries may be cached in the entry of the translation lookaside buffer.

13. The memory management system of claim 11, where the memory page size management software consolidates the run of contiguous page table entries based on access permissions for the run of contiguous page table entries.

14. The memory management system of claim 11, where the memory page size management software determines whether the run of contiguous page table entries can support a memory page size of $X*Y$ pursuant to determining whether the run of contiguous page table entries may be cached in the entry of the translation lookaside buffer.

15. The memory management system of claim 11, where the memory page size management software determines whether a virtual address corresponding to the run of contiguous page table entries is a multiple of Z pursuant to determining whether the run of contiguous page table entries may be cached in the entry of the translation lookaside buffer, where Z=X*Y.

16. The memory management system of claim 11, where the memory page size management software consolidates the run of contiguous page table entries based on memory boundary conditions for the run of contiguous page table entries.

17. The memory management system of claim 11, where the memory page size management software organizes the page table entries of the page table so that consecutive page table entries may be accessed to fill a single translation lookaside buffer entry.

18. The memory management system of claim 11, further comprising translation lookaside miss software, where the translation lookaside miss software accesses consecutive page table entries to fill a single translation lookaside buffer entry, and where the number of consecutive page table entries is equal to X.

19. A method for managing memory of a processing system comprising:
    detecting a change in a page table including a plurality of page table entries, where each of the plurality of page table entries includes information for translating a virtual address to a corresponding physical address;
    responding to the detection by identifying a run of contiguous page table entries having substantially the same access permission information; and
    analyzing the run of contiguous page table entries to determine whether the run of contiguous page table entries may be consolidated using a larger memory page size, Y, and whether the run of contiguous page table entries may be consolidated for caching in an entry of a translation lookaside buffer that caches multiple page table entries, X, in a single translation lookaside buffer entry.

20. The method of claim 19, where the analysis comprises determining whether the run of contiguous page table entries can support a larger page size of X*Y.

21. The method of claim 19, where the analysis comprises determining whether a virtual address corresponding to the run of contiguous page table entries is a multiple of Z pursuant to determining whether the run of contiguous page table entries may be cached in an entry of the translation lookaside buffer, where Z=X*Y.

22. The method of claim 19, where the memory page size management software consolidates the run of contiguous page table entries based on memory boundary conditions for the run of contiguous page table entries.

23. The method of claim 19, where the memory page size management software consolidates the run of contiguous page table entries based on access permissions for the run of contiguous page table entries.

* * * * *